United States Patent [19]

Gebeke

[11] 4,204,654
[45] May 27, 1980

[54] TAPE GUIDE ASSEMBLIES FOR VIDEO CASSETTES

[75] Inventor: Charles D. Gebeke, White Bear Lake, Minn.

[73] Assignee: Minnesota Mining and Manufacturing Company, St. Paul, Minn.

[21] Appl. No.: 830,812

[22] Filed: Sep. 6, 1977

[51] Int. Cl.² .................. G11B 23/04; B65H 23/26
[52] U.S. Cl. ................................ 242/199; 226/196; 242/76; 403/263
[58] Field of Search ............. 226/196, 197, 198, 199; 242/76, 199, 200; 403/244–246, 263

[56] References Cited

U.S. PATENT DOCUMENTS

| 3,516,616 | 6/1970 | Adell | 226/196 X |
|---|---|---|---|
| 3,556,569 | 1/1971 | Bruhn | 403/262 |
| 3,802,647 | 4/1974 | Esashi et al. | 242/199 |
| 3,934,842 | 1/1976 | Posso | 242/199 |

OTHER PUBLICATIONS

Proposed SMPTE Specifications, No. VTR 16.14/6–43., Oct. 23, 1975, pp. 1–9.

Primary Examiner—Bruce H. Stoner, Jr.
Attorney, Agent, or Firm—Cruzan Alexander; Donald M. Sell; William L. Huebsch

[57] ABSTRACT

Improved tape guide assemblies for a video tape cassette of the type having two reels between which a length of tape is wound, with each of the reels having only one tape guide flange and the reels being positioned axially parallel with their flanges overlapping and along opposite edges of the tape. One improved tape guide assembly is positioned adjacent each reel to guide at least one side surface and the edge opposite the flange of the tape being wound on or removed from the reel. Each tape guide assembly has an arcuate side guide portion of a smooth low friction polymeric material for guiding the side surface of the tape, and a metal washer at its end opposite the flange of the adjacent reel for guiding the edge of the tape. The tape guide assemblies are attached by screws adapted to be pressed into the side guide portions to facilitate assembly of the cassette, and engage the housing to restrict rotation relative thereto which facilitates removal of the screws to disassemble the cartridge.

2 Claims, 5 Drawing Figures

TAPE GUIDE ASSEMBLIES FOR VIDEO CASSETTES

BACKGROUND OF THE INVENTION

This invention relates to tape guide assemblies in video tape cassettes.

Video tape cassettes for use in video recording and/or playback machines typically comprise a housing, a predetermined length of magnetic recording tape, and two tape storage reels rotatably mounted in the housing. Each of the reels comprises a hub with each end portion of the tape attached to and wrapped around a different one of the hubs. Each reel has only one tape guide flange which is fixed at one end of its hub, which flange has sufficient diameter to cover the entire side surface of the tape when almost all of the tape is wound around its hub. The reels are mounted in the housing in axially parallel spaced positions with the flanges overlapping and on opposite edges of the tape. The cassette also includes means for defining a tape path between the reels including two tape guide assemblies, one mounted on the housing adjacent each of the reels to guide at least one side surface and the edge opposite the flange of tape being wound on or removed from the reel. Each tape guide assembly includes one arcuate side guide portion for guiding the side surface of the tape and a radially projecting edge guide washer at its end opposite the flange of the adjacent reel which cooperates with that flange to guide tape onto or off of the adjacent reel; and one of the tape guide assemblies has two parallel closely spaced arcuate side guide portions that guide the tape as it passes between them.

In prior art cassettes both the arcuate side guide portions and edge guide washers of the tape guide assemblies are formed of steel, with the side guide portions being attached to the cassette by conventional screws. Thus the tape guide assembly is expensive to make because of the cost of its material and the work required to finish its outer surface and form internal threads, and is time consuming and thus expensive to assemble into a cassette because the screws must be rotated into engagement with it.

Also as the side surface of the tape rubs against the steel side guide portion particles of the tape coating are removed and form debris which, after many uses of the tape, can collect and cause dropouts and other losses of picture clarity in a video recording and/or playback machine in which the cartridge is used.

SUMMARY OF THE INVENTION

The present invention provides improved tape guide assemblies for a video tape cassette of the type described above which are less expensive, easier to assemble into the cassette, and produce less debris from engagement with the guided tape than prior art tape guide assemblies.

The tape guide assemblies according to the present invention include arcuate side guide portions for guiding the side surface of the tape which are made of a stiff, smooth, low friction polymeric material that produces less debris as the side surface of the tape passes over it than do steel side guide portions; which polymeric side guide portions are used in combination with an edge guide washer which is made of metal to prevent edge cutting of the washer and resultant edge damage to the tape.

The tape guide assemblies are attached in the cassette by screws adapted to be pressed into the polymeric material of the side guide portions, which facilitates assembly of the cassette. Also the tape guide assemblies include means restricting rotation of the side guide portion on the housing so that the screws can be rotated out of engagement with the side guide portion to facilitate disassembly of the cartridge.

The tape guide assembly used adjacent one of the reels consists of a single polymeric arcuate side guide portion having a central opening and at least one axially extending projection extending through an opening in the edge guide washer and into a socket in the housing to restrict rotation of the side guide portion. This tape guide assembly is attached to the housing by two screws having helically threaded portions in the central opening and engaging opposite ends of the polymeric side guide portion, the threads on the screw being inclined away from the leading end of the screw and having been pressed into the side guide portion.

The tape guide assembly used adjacent the other of the reels comprises two axially parallel closely spaced arcuate side guide portions between which the tape is guided. These side guide portions are integrally formed of the polymeric material and are joined by a radially extending plate at their end opposite the edge guide washer. One of these side guide portions has a central opening and the other has a projection on its end opposite the plate. The metal washer is elongate and has one opening aligned with the central opening and another adapted to receive the projection. The tape guide assembly is attached to the housing by two screws of the type described above which have been pressed into opposite ends of the central opening.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
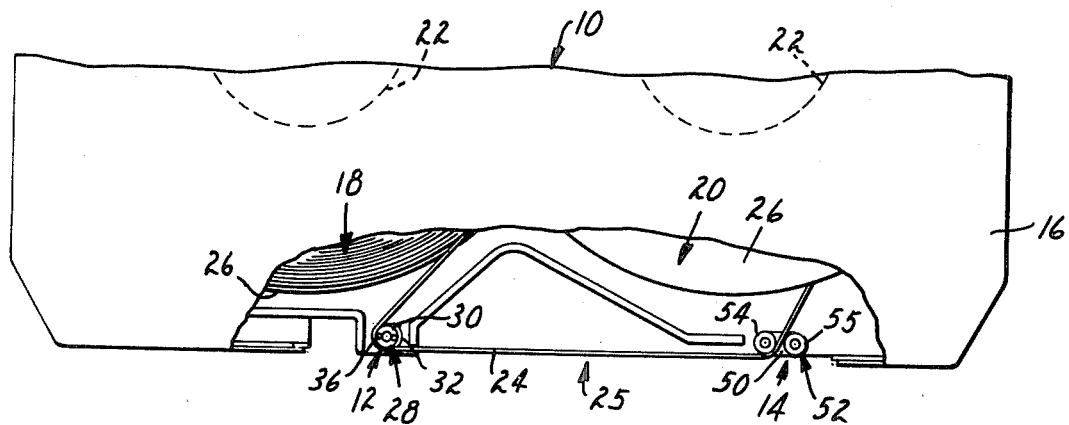
FIG. 1 is a fragmentary view of a video tape cassette including two tape guide assemblies according to the present invention and having parts broken away to show details.

Referring now to the drawing there is shown a video tape cassette 10 including the improved tape guide assemblies 12 and 14 according to the present invention.

The cassette 10 is constructed to comply with the Proposed Society of Motion Picture and Television Engineers Specifications providing the dimensions for either the video cassette (document No. VTR 16.14/6–43) or the small type video cassette (document No. VTR 16.14/3–27), both of which cassettes are intended for ¾ inch type-A Format Video Magnetic tape for cassette systems, the contents of which documents are incorporated herein by reference. Briefly, the cassette 10 comprises a two part housing 16 in which are rotatably journaled two reels 18 and 20 in axially parallel relationship. Each of the reels 18 and 20 includes a hub 22. A predetermined length of video recording tape 24 has each of its end portions attached to and wound around a different one of the hubs 22 with the tape 24 between the reels 18 and 20 extending past the tape guide assemblies 12 and 14 and through a tape access area 25 defined on the housing 16. Each of the reels 18 or 20 comprises only one tape guide flange 26 which is positioned at one end of its hub 22, which flange 26 is of sufficient diameter to cover the entire side surface of the tape 24 when essentially all of the tape 24 is wound around the hub 22. The reels 18 and 20 are spaced and positioned so that the flanges 26 overlap and are on opposite edge surfaces of the tape 24.

A video tape recording or playback machine (not shown) into which the cassette 10 can be loaded can engage the tape at the tape access area 25 and by rotation of the hubs 22 can move the tape 24 past recording and/or playback heads in the machine. During such movement of the tape 24 an arcuate side guide portion 30 of polymeric material in the tape guide assembly 12 guides one side surface of the tape moving onto or off of the reel 18, while a metal edge guide washer 27 in that assembly 12 cooperates with the flange 26 of the reel 18 to guide the edges of the tape 24. Also two closely spaced arcuate side guide portions 54 and 55 of the tape guide assembly 14 guide the side surfaces of tape therebetween moving onto or off of the reel 20, while a metal edge guide washer 50 in that assembly 14 cooperates with the flange 26 of the reel 20 to guide the edges of the tape 24.

Figure 2:
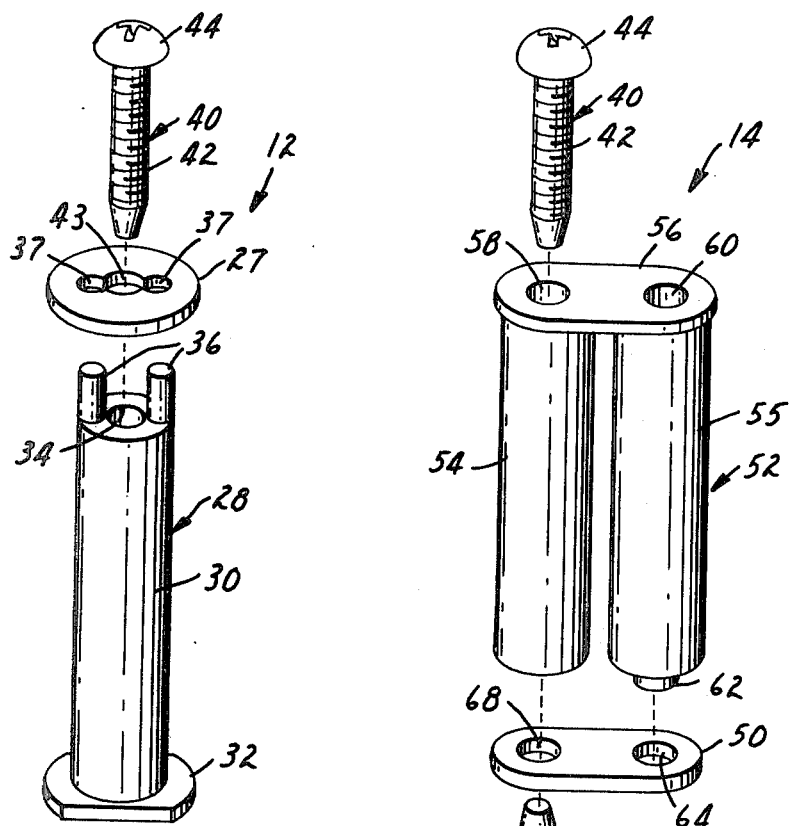
FIG. 2 illustrates an enlarged exploded view of one of the tape guide assemblies of FIG. 1.

As is best seen in FIG. 2, the first tape guide assembly 12 comprises the edge guide washer 27 which is preferably of hard smooth metal such as stainless steel, and a part 28 including the arcuate side guide portion 30 formed, as by injection molding, of a stiff, smooth, low friction polymeric material; preferably the acetal homopolymer sold under the trade designation "Delrin 500CL" by DuPont. The side guide portion 30 of the part 28 is cylindrical and has a length adapted to be engaged by the entire side surface of the tape 24. The part 28 also includes a radially extending plate 32 at one end which serves, when needed, as a tape edge guide on the end of the side guide portion adjacent the flange 26 of the adjacent reel 18, and two spaced pins 36 axially extending from its end opposite the plate 32 which flank a central opening 34 in the part and project through mating openings 37 in the washer 27 into sockets in the housing 16 to restrict rotation of the part 28. The washer 27 and part 28 are held in place in the housing by two screws 40 one of which has a threaded end portion 42 that extends through the housing 16 and a central bore 43 in the edge guide washer 27, and is positioned in the central opening 34 where its threads engage the polymeric material of the part 28. The other screw 40 has a threaded end portion extending through the housing 16 and into the central opening 34 on the end of the part 28 opposite the washer 27. The screws 40 are of the type commercially designated "Pushtite" and sold by the Camcar Screw Co. of Belvedere, Ill. Briefly such screws have threaded end portions 42 on which the surfaces of the threads adjacent their tips are inclined away from their tips to afford pressing the threaded ends of the screws into interference fit openings in a member of polymeric material, and in which the surfaces of the threads adjacent their heads 44 are generally at right angles to their axes so that once the screws have been pressed into the openings the threads will engage the material to hold the screws in place and the screws can then be removed (as for disassembly of the cassette 10) by rotating them. Such rotation of the screws 40 is facilitated by engagement of the pins 36 in the housing which stop rotation of the part 28 with the screw 40.

Figures 3, 4, 5:
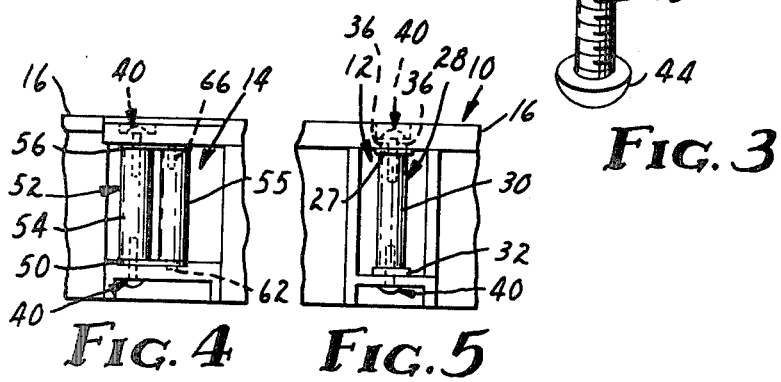
FIG. 3 illustrates an enlarged exploded view of a second of the tape guide assemblies of FIG. 1.
FIG. 4 is a front elevational view of a fragment of the cassette of FIG. 1 which includes the tape guide assembly shown exploded in FIG. 3.
FIG. 5 is a front elevational view of a fragment of the cassette of FIG. 1 which includes the tape guide assembly shown exploded in FIG. 2.

As is best seen in FIGS. 3 and 4 the second tape guide assembly 14 comprises the edge guide washer 50 which is preferably of hard smooth metal such as stainless steel, and a part 52 including the arcuate side guide portions 54 and 55 formed as by injection molding of a stiff, smooth, low friction polymeric material, such as "Delrin 500CL". The part 52 includes the two cylindrical axially parallel closely spaced side guide portions 54 and 55 which have a length adapted to be engaged by the entire width of one or both of the side surfaces of the tape 24 passing therebetween; and a radially extending plate 56 joining the guide portions 54 and 55 at one end which serves, when needed, as a tape edge guide on the end of the side guide portions 54 and 55 adjacent the flange 26 of the adjacent reel 20. The side guide portion 55 has a pin 62 axially extending from its end opposite the plate 56 which projects into a mating opening 64 in the washer 50, and a cavity 60 receiving a pin 66 molded on the housing 16. The washer 50 and part 52 are held in place in the housing by two of the screws 40 described above; one of which has a threaded end portion extending through an opening in the housing 16, an opening 68 in the edge guide washer 50 and into a central opening 58 in the side guide portion 54 where its threads engage the polymeric material of the side guide portion 54; and the other of which has a threaded end portion extending through the housing and into the opposite end of the central opening 58 where its threads engage the side guide portion 54.

I claim:

1. In a video tape cassette comprising a housing; a predetermined length of magnetic recording tape; first and second reels rotatably mounted in said housing, each of said reels comprising a hub and only one flange fixed at one end of the hub, each end portion of the tape being attached to and wound about a different one of the hubs and each of said reel flanges having a sufficient diameter to cover the entire side surface of the tape when almost all of the tape is wound around that hub, said reels being mounted in said housing in axially parallel spaced positions with said flanges overlapping and on opposite edge surfaces of the tape between said reels; and means mounted on said housing for defining a tape path between said reels comprising at least one tape guide assembly adjacent each of said reels, one of said tape guide assemblies including two axially parallel, closely spaced arcuate side guide portions guiding the side surfaces of said tape therebetween and being integrally formed with a radially extending plate joining the ends of said side guide portions adjacent the flange of the adjacent reel of a stiff, smooth, low-friction polymeric material, one of said side guide portions having a central opening and the other having a projection at its end opposite said plate; an elongate, hard, smooth metal edge guide washer at the ends of said side guide portions opposite the flange of the adjacent reel, said edge guide washer having one opening aligned with said central opening and another opening adapted to receive said projection; and two screws attaching said tape guide assembly to said housing, said screws having helically threaded portions in said central opening and engaging opposite ends of said side guide portion, the threads of said screws being inclined away from the leading ends of the screws to afford pressing said screws into said side guide portion and subsequent threaded engagement therewith.

2. A cassette according to claim 1, wherein said side guide portion is an injection molding of an acetal polymer.

* * * * *